United States Patent [19]
Holleboom et al.

[11] 3,793,826
[45] Feb. 26, 1974

[54] ELECTRONIC START CONTROL CIRCUIT FOR GAS TURBINE ENGINE

[75] Inventors: Bruce W. Holleboom; Douglas W. Sweet, both of Flint, Mich.

[73] Assignee: General Motors Corporation, Detroit, Mich.

[22] Filed: Dec. 8, 1972

[21] Appl. No.: 313,552

[52] U.S. Cl. .......................................... 60/39.14 R
[51] Int. Cl. .............................................. F02c 7/26
[58] Field of Search ............................... 60/39.14 R

[56] References Cited
UNITED STATES PATENTS
3,662,545 5/1972 Davis ................................. 60/39.14
3,686,859 8/1972 White ................................ 60/39.14
3,520,133 7/1970 Loft et al. ......................... 60/39.14
3,382,671 5/1968 Ehni .................................. 60/39.14

*Primary Examiner*—Carlton R. Croyle
*Assistant Examiner*—Warren Olsen
*Attorney, Agent, or Firm*—Paul Fitzpatrick

[57] ABSTRACT

An automatic start control circuit for a gas turbine engine which, upon activation of a start signal, engages a starter motor to accelerate the engine to a speed at which the engine will fire. Thermocouples, a speed sensor and various analog and logical elements combine to automatically disengage the starter when idle speed is reached, if acceleration falls below a critical value, if combustion temperature exceeds a critical value, if no "light-off" occurs or if a thermocouple fails.

2 Claims, 3 Drawing Figures

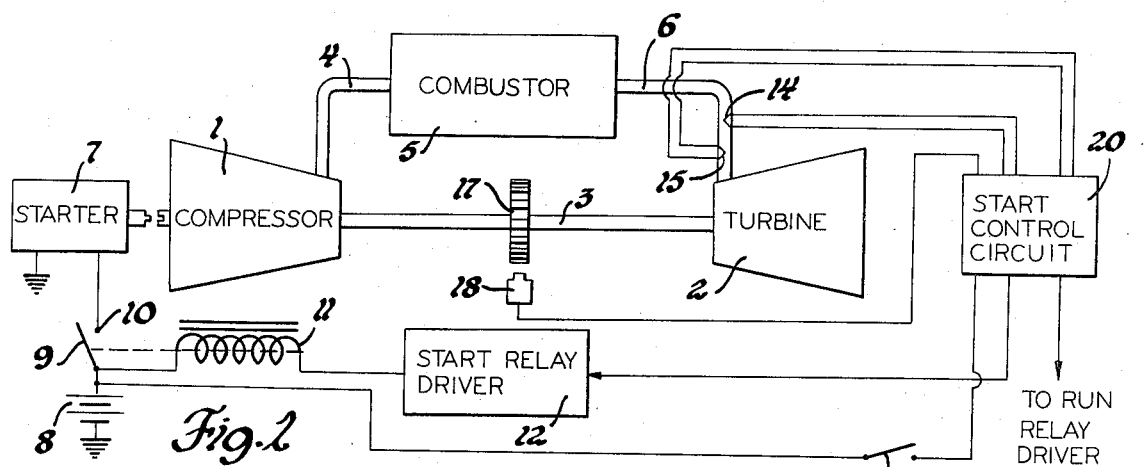
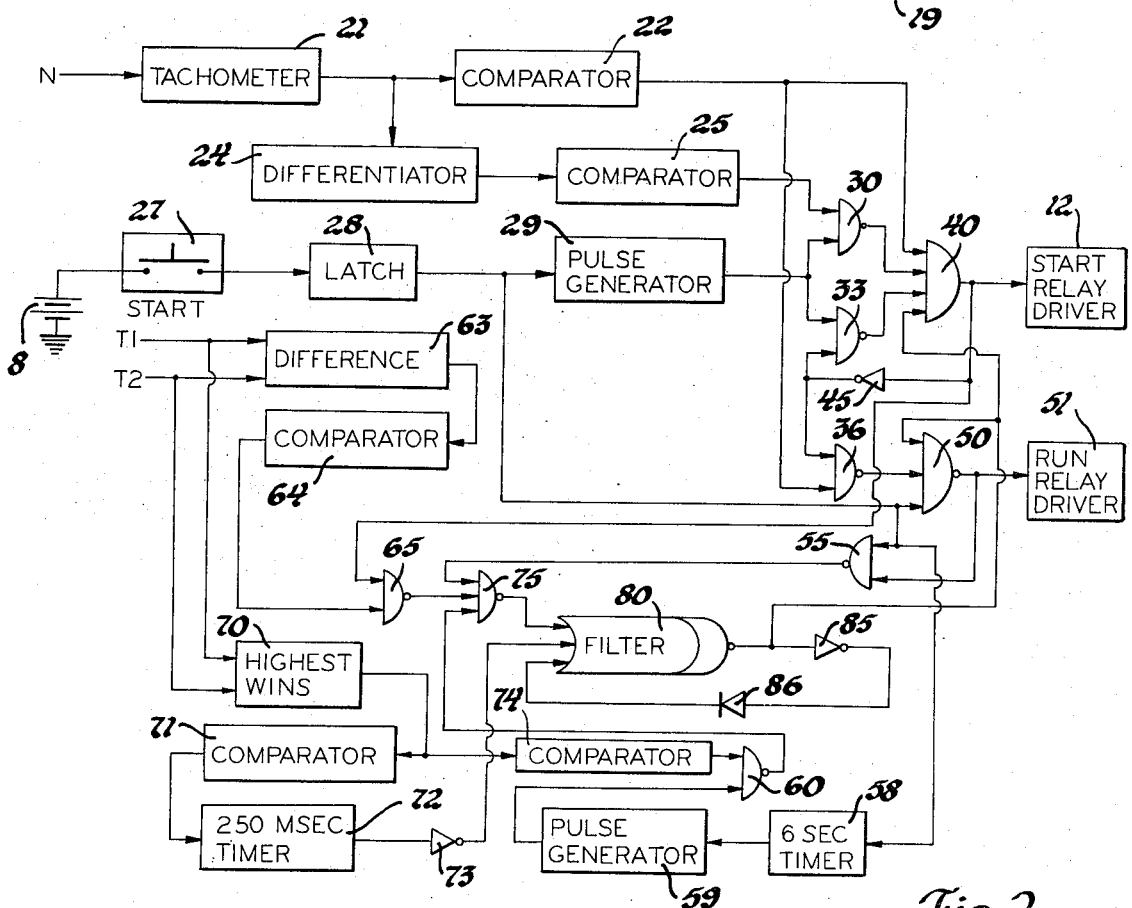
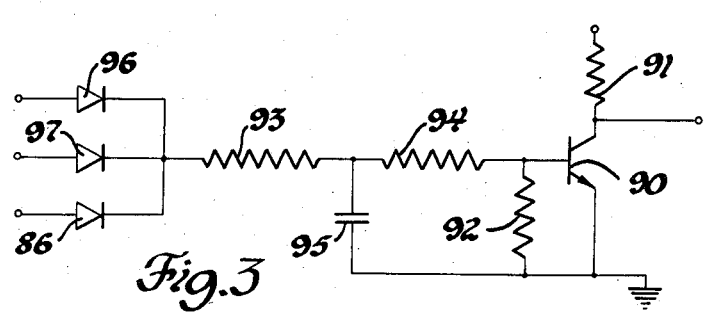

ELECTRONIC START CONTROL CIRCUIT FOR GAS TURBINE ENGINE

SUMMARY OF THE INVENTION

The starting of a gas turbine engine is a complex operation which is most desirably done automatically. Before it will run on its own power, a typical gas turbine engine might have to be accelerated to more than 15,000 RPM. If an electric starting motor is used to accelerate the turbine to this speed, engine design parameters, available electric power and environmental factors such as temperature and air pressure can cause starting time to vary from merely a few seconds to more than a minute. During this time, there are a number of malfunctions which can prevent the engine from starting satisfactorily. If one of these malfunctions should occur, it is generally desirable to abort the start and shut down the engine as soon as possible, both to prevent damage to the engine and to preserve the possibility of a good start on the next attempt.

In addition to apparatus which shuts down the engine upon sensing specific malfunctions, some gas turbine start control systems include backup apparatus which automatically shuts down the engine if its speed has not reached a certain value within a specified interval. The interval is chosen to be long enough so that, even though no specific malfunction has been sensed, the engine will probably not start on this attempt if it is still cranking at the end of this time. However, if the unsensed malfunction occurs early in this interval, the battery will be unnecessarily discharged; and some damage may occur before the interval elapses and the start is aborted. In addition, if the interval is kept short, it will be difficult to start the engine in cold temperatures when starting normally takes longer.

The system disclosed herein senses turbine engine start viability by monitoring turbine acceleration. Within a short time, such as two seconds, after the starting motor is engaged with the turbine, the instantaneous turbine acceleration should have reached a specified value below which it should not fall until the engine is running on its own power. If the acceleration does fall below the specified value the start should be aborted, and the subject system contains circuitry to cause the start to be aborted immediately following such an occurence. The subject system has many other useful features. Dual thermocouples measure the temperature near the turbine inlet. An error signal is produced if one of these thermocouples fails. The higher reading is compared with a reference value and an error signal is produced if excessive temperature exists longer than a specified time. The higher reading thermocouple is also checked after a specified interval and an error signal is produced if the temperature does not exceed a specified level, signifying "no light-off". Any of these error signals will cause the start to be immediately aborted.

Further details and objectives of the subject invention appear in the accompanying drawings and the following description of a preferred embodiment.

DESCRIPTION OF THE DRAWINGS

FIG. 1 is a schematic diagram showing the invention in its environment.

FIG. 2 is a preferred embodiment of the invention.

FIG. 3 is a detailed circuit diagram of a portion of the preferred embodiment.

DESCRIPTION OF THE PREFERRED EMBODIMENT

FIG. 1 shows a portion of a conventional gas turbine engine. Air is drawn into the compressor 1, which is powered by a turbine 2 through a shaft 3. The compressed air from the compressor 1 is fed through a conduit 4 into a combustor 5, where it is mixed with fuel in a controlled amount and ignited. The resulting hot expanding gases escape from the combustor 5 through another conduit 6 into the turbine 2, which they power. This structure may be a gas generator or gasifier which delivers hot gas to another turbine, or it may constitute the entire gas turbine engine and deliver shaft power or a propulsive jet, for example.

An electric start motor 7 engages and turns the compressor 1 and turbine 2 when electric power is supplied to it from the power source 8 through normally open relay contacts 10 The relay contacts 10 can be closed by an armature 9 which is actuated by an actuating coil 11, powered by a start relay driver 12. The start relay driver 12 is controlled by the start control circuit, shown generally as 20. A main power reset switch 19 supplies power from the power source 8 to the circuit elements of the start control circuit 20.

In order to supply engine monitoring information to the start control circuit 20, three sensors are used with the engine of FIG. 1. Two thermocouples 14 and 15 are located in the conduit 6. The thermocouples 14 and 15 supply electrical signals T1 and T2, respectively, to the start control circuit 20. A toothed wheel 17 rotates with the shaft 3. A magnetic pickup 18 is positioned to sense the rate at which the teeth of the toothed wheel 17 move past it and supply a signal N, indicative of turbine speed, to the start control circuit 20.

The start control circuit 20 is shown in FIG. 2. Tachometer 21 converts the speed signal N from magnetic pickup 18 into a voltage proportional to the frequency of N and feeds this voltage to a comparator 22. The comparator 22 is an analog to digital converting device that compares the voltage of the signal from the tachometer 21 to a preset reference voltage and which produces either a low or high output signal, depending on whether the tachometer signal voltage is greater or less, respectively, than the reference voltage. In addition, the comparator 22 has built-in hysteresis in switching between the two outputs. Specifically, comparator 22 switches from the high to the low state when turbine speed exceeds a value which typically corresponds to forty-three percent rated speed and switches from the low to the high state when turbine speed falls below a value corresponding typically to forty percent rated speed. The output signal from the comparator 22 is applied to an input of an AND gate 40.

The output of tachometer 21 is also applied to an analog differentiator 24. The output of the differentiator 24 is a voltage indicative of turbine acceleration which is applied to a comparator 25. The comparator 25 is similar in design to the comparator 22; and the output signal of comparator 25 switches from a high to a low level when the input exceeds the value typically corresponding to a reference level of 200 RPM per second, a comparatively low figure that allows starting at the lower acceleration levels typical of cold temperature operation, and switches from the low state to the high state when the input falls below a value typically corresponding to a reference level of 100 RPM per second. The comparator 25 is designed with large hysteresis because of the inherently large amount of noise in the output of the differentiator 24. The output of the comparator 25 is applied to an input of a NAND gate 30.

A pushbutton start switch 27 is connected to supply electric power, when actuated, from the power source 8 to a latch 28. The latch 28 is a circuit that produces either a high or a low output signal. When the main power switch 19 is closed but before the start switch 27 is actuated, the latch 28 produces a low output signal. The actuation of the start switch 27 supplies a start signal to the latch 28 which causes it to generate the high output signal, which it maintains regardless of the subsequent state of the start switch 27 until the main power switch 19 is opened and the power source 8 is disconnected from the start control circuit 20. The output of the latch 28 is applied to a pulse generator 29 whose output is ordinarily high. When the latch 28, however, switches from the low to the high state, the pulse generator 29 produces a single pulse in the low state lasting typically 1.5 to 2 seconds. The output of the pulse generator 29 is applied as an input to the NAND gate 30 and another NAND gate 33. The output of the NAND gate 30 is applied as an input to the AND gate 40.

The output of the AND gate 40 controls the start relay driver 12: a high output signal causes the relay contacts 10 to be closed and the starter 7 to be engaged; and a low output signal causes the relay contacts 10 to be opened and the starter 7 to be disengaged. The output of the AND gate 40 is also applied through an inverter 45 as an input of the NAND gate 33 and an input of a NAND gate 36. The output of the NAND gate 33 is applied as an input to the AND gate 40. The output of the comparator 22 is applied as an input of the NAND gate 36; and the output of the NAND gate 36 is applied as an input to a NAND gate 50. The NAND gate 50, when low, activates the run relay driver, 51, which causes power to be supplied to the engine ignition system and to means to initiate fuel flow. The output of the latch 28 is also applied as an input to the NAND gate 50, another NAND gate 55 and a timer 58. The timer 58 is a device whose output is normally low but which switches to a high output a certain preset time, 6 seconds in this embodiment, after receiving a high input. The output of the timer 58 is applied to a pulse generator 59, which generates a high pulse of short duration when it receives a high input. The output of the pulse generator 59 is applied as an input to a NAND gate 60.

The signals T1 and T2 from thermocouples 14 and 15, respectively, are applied both to the difference generator 63 and the "highest wins" network 70. The difference generator 63 produces an output signal voltage equal to the magnitude of the difference between T1 and T2 and applies it to a comparator 64. The comparator 64 compares the input signal voltage with a preset reference voltage and produces an output signal which is low if the input signal voltage is less than the reference voltage and is high if the input signal voltage is greater than the reference voltage. The output of the comparator 64 is applied to an input of a NAND gate 65. The output of the AND gate 40 is also applied as an input to the NAND gate 65; and the output of the NAND gate 65 is applied as an input to a NAND gate 75.

The "highest wins" network 70 compares T1 and T2, selects the higher of the two and applies the higher as input to comparators 71 and 74. In the comparator 71, the input signal voltage is compared with a preset reference voltage and an output signal is produced which is low if the input is less than the reference voltage and high if the input is greater than the reference voltage. The output of the comparator 71 is applied to a 250 millisecond timer 72, which produces a low output at all times except when a high input has been applied for more than 250 milliseconds, at which time it switches to a high output and maintains this output as long as the high input continues. The output of the 250 millisecond timer 72 is applied through an inverter 73 as an input to a filtered NOR gate 80, which will be described in detail at a later point in this specification.

The output of the comparator 74, low if the input signal voltage exceeds the reference voltage and high if it does not, is applied as an input to the NAND gate 60. The output of the NAND gate 60 and the output of the NAND gate 55 are both applied as inputs to the NAND gate 75. The output of the NAND gate 75 is applied as an input to the filtered NOR gate 80. The output of the filtered NOR gate 80 is applied as an input to the NAND gate 50 and the AND gate 40; and, in addition, is applied through a feedback loop consisting of an inverter 85 and diode 86 as an input to itself.

The filtered NOR gate 80, shown in detail in FIG. 3, is a NOR gate with a filtered input. The gate itself consists of an NPN transistor 90 in a grounded emitter configuration with bias supplied by resistor 91 connecting the collector of transistor 90 to a positive electrical voltage and resistor 92 connecting the base of transistor 90 to ground, an input to the base of transistor 90 through the resistors 93 and 94 in series and an output taken at the junction between the collector of transistor 90 and the resistor 91. In a normal NOR gate the input resistance to the base of the transistor 90 would be confined to one resistor; but the splitting of this resistance between resistors 93 and 94 allows the input to the transistor 90 to be filtered by the addition of a capacitor 95 between the junction of resistors 93 and 94 and ground. The addition of diodes 96 and 97 in the input lines from the NAND gate 75 and inverter 73, respectively, provides isolation and prevents any reverse currents being fed back along those input lines.

In operation, the closure of the main power switch 19 supplies operating power from the power source 8 to the elements of the start control circuit 20. Closure of the pushbutton start switch 27 causes the latch 28 to switch high and the pulse generator 29 to produce a low pulse. This pulse causes the NAND gates 30 and 33 to both switch high. Since the turbine 2 is certainly not rotating at greater than forty-three percent of rated speed, the output of comparator 22 is high; and, assuming that the output of the filtered NOR gate 80 is high, the AND gate 40 switches high and causes the start relay driver 12 to close the relay contacts 10; and this causes the starter 7 to be engaged. The high output signal of the AND gate 40 causes the output of inverter 45 to switch low and the output of the NAND gate 36 to therefore switch high. Since all inputs to the NAND gate 50 are high, it will switch low and activate the run relay driver. When the AND gate 40 is in a high state and the NAND gate 50 is in a low state the system is said to be in start mode.

Within 1.5 to 2 seconds of the closure of the start switch 27, the pulse generator 29 will switch high again. From this moment, the alternate inputs to the NAND gates 30 and 33 are important in maintaining the start mode. The low output of inverter 45 insures that the NAND gate 33 will continue in its high state as long as the system is in the start mode. Should the output of the AND gate 40, however, switch low at any time after the pulse generator 29 has switched high, the inverter 45 and NAND gate 33 will latch the AND gate 40 in the low state and prevent the system from entering the start mode until the main power switch 19 is opened and closed and the start switch 27 closed once again. This guarantees proper starter dropout when desired and prevents "starter bounce".

If the starting system is operating correctly, the 1.5 to 2 second duration of the low pulse from the pulse generator 29 will be of sufficient length to allow the start relay to engage the starter, and for the acceleration of the turbine 2 to become high enough to cause the comparator 25 to switch low. This enables the NAND gate 30 to remain high after the pulse generator 29 is switched high.

Once the start control circuit has entered the start mode, it will remain in the start mode until one of the inputs to the AND gate 40 switches low. In normal operation, that will happen when the turbine 2 reaches forty-three percent of its rated speed and the comparator 22 switches low. This causes AND gate 40 to switch low and the starter 7 to be disengaged. Inverter 45 switches high and, in addition to latching AND gate 40 low, as previously described, now supplies a high input to NAND gate 36. Since the output of comparator 22 is now low, however, the NAND gate 50 remains low and the engine has been successfully started. From this point the NAND gate 36 acts as a low speed error switch to shut down the engine should turbine speed N drop below the switching point of comparator 22.

Before the turbine 22 reaches 43 percent of its rated speed, however, the AND gate 40 will be switched low if acceleration drops below the acceleration reference level, which causes the NAND gate 30 to switch low, or if one of a number of malfunctions not yet described causes the filtered NOR gate 80, which will also be referred to as the master-error gate 80, to switch low, which state will be referred to as the error mode. In addition, it should be pointed out at this point that, if the AND gate 40 should switch to its low state at any time before the speed of turbine 2 reaches forty-three percent of its idle speed and causes the comparator 22 to switch low, the resulting high signal from inverter 45 will cause the NAND gate 36 to switch low, the NAND gate 50 to be switched high and the run relay 51 to be deactivated. The NAND gate 50 will also be switched high directly by a low output from the master-error gate 80. Thus, if a start is aborted for any reason, the entire engine will be shut down to prevent damage and prepare for a new starting attempt.

Dual thermocouples, 14 and 15, are used for redundancy and failure detection. The thermocouples 14 and 15 are positioned in such a way close to the inlet of the turbine 2, where the burning gases are well mixed, that they should both sense approximately the same temperature at all times during the start. If the magnitude of the difference in temperature signals from thermocouples 14 and 15 becomes too great, it is most probably a sign that one of them has failed. The difference generator 63 and comparator 64 produce a high level input to the NAND gate 65 when this condition occurs. If the output of the AND gate 40, which is the other input to the NAND gate 65, is also high, the NAND gate 65 switches low. This causes the NAND gate 75 to switch high and the master-error gate 80 to switch low into the error mode. Thus, an error signal is produced if a thermocouple fails when the engine is in the start mode.

The "highest wins" network 70 picks the higher of the two temperature signals T1 and T2 as the most appropriate to use in the over-temperature and "no light-off" circuitry. The higher temperature signal is applied to the comparator 71 in which it is compared with its maximum allowable temperature, which, in this embodiment, is set at 2,000° F. If the former exceeds the latter, a high output from the comparator 71 starts a 250 milliseconds timer 72. The timer 72 prevents the further application of this high signal unless the high temperature condition lasts longer than 250 milliseconds. This allows engine operation to continue in spite of brief temperature flashes or electric noise signals which are not in themselves cause for stopping the engine or aborting a start. If the high temperature condition is still present at the end of 250 milliseconds, however, the timer 72 switches high and causes a low output from the inverter 73 to switch the master-error gate 80 into the error mode.

The output of the "highest wins" network 70 is also applied to a comparator 74 in which combustor temperature is compared with the preselected temperature, 1,250° F for example, which the combustor gases will certainly exceed if "light-off" has occured and they are burning. Until this temperature is exceeded, the comparator 74 will supply a high input to the NAND gate 60. Upon initial closure of the start switch 27 and switching of the latch 28, a high input is applied to the six second timer 58. At the end of 6 seconds, timer 58 switches high and causes the pulse generator 59 to emit a short high pulse which, in turn, is applied to the other input of the NAND gate 60. When both inputs of the NAND gate 60 are high, which can only happen if the comparator 74 is still indicating a low temperature when the pulse occurs, 6 seconds after the start switch 27 is closed, a low output from the NAND gate 60 will cause the NAND gate 75 to switch high and the master-error gate 80 to switch to the error mode. The master-error gate 80 will also be activated through the NAND gate 75 and the NAND gate 55 if, at any time after the latch 28 is activated, the AND gate 50 switches high.

In addition, whenever the master-error gate 80 is switched into its error mode, the latching feedback loop consisting of the inverter 85 and the diode 86 will cause it to stay in the error mode and prevent the engine from entering the start mode until the main power switch 19 is opened and closed with the condition that produced the error signal no longer present.

Our invention as described above is a circuit that allows fully automatic pushbutton starting of a turbine engine and is believed to be an advance over similar prior art circuits. The circuit as described is a preferred embodiment of the invention. Other embodiments will occur to those skilled in the art; and therefore our invention should not be restricted to that shown.

What is claimed is:

1. A start control circuit for a gas turbine engine including starting means operable to accelerate the engine to a predetermined speed and means responsive to a signal to enable the starting means and responsive to the absence of a signal to disable the starting means, the start control circuit comprising, in combination:

means responsive to engine speed effective to generate an output signal until engine speed exceeds the predetermined speed;

means responsive to engine acceleration effective to generate an output signal when engine acceleration exceeds an acceleration reference level;

a pulse generator actuable to generate an output signal of predetermined duration;

first gate means having inputs from the engine acceleration responsive means and the pulse generator and being actuable by a signal condition on either of the inputs to generate an output signal;

second gate means having an input from the pulse generator and another input and being actuable by a signal condition on either input to generate an output signal;

and third gate means having inputs from the engine speed responsive means, the first gate means and the second gate means and being actuable by simultaneous signal conditions on all inputs to generate an output signal, said output signal being applied to the other input of the second gate means and the signal responsive means.

2. A start control circuit for a gas turbine engine including an ignition system, starting means operable to accelerate the engine to a predetermined speed, first signal responsive means responsive to a high signal to enable the starting means, and responsive to a low signal to disable the starting means, and second signal responsive means responsive to a low signal to activate the ignition system and responsive to a high signal to deactivate the ignition system, the start control circuit comprising, in combination:

means responsive to engine speed during engine acceleration to generate a high signal until the predetermined speed is exceeded and a low signal after the predetermined speed is exceeded;

means responsive to engine acceleration to generate a low signal when engine acceleration exceeds an acceleration reference level and a high signal when engine acceleration falls below the acceleration reference level;

means to generate a start signal;

latch means triggerable by the start signal to generate a continuous high output signal, the latch means including a reset switch and being actuable by the reset switch to generate a low output signal;

a pulse generator effective to generate a high output signal and triggerable by a change from low to high in the output signal of the latch means to generate a low output signal pulse;

a first NAND gate with inputs from the engine acceleration responsive means and the pulse generator;

an inverter;

a second NAND gate with inputs from the pulse generator and the inverter;

a third NAND gate with inputs from the engine speed responsive means and the inverter;

an AND gate with inputs from the engine speed responsive means, the first NAND gate and the second NAND gate and an output applied to the inverter and the first signal responsive means;

and a fourth NAND gate with inputs from the inverter and the latch means and an output applied to the second signal responsive means.

* * * * *